US011620589B2

(12) United States Patent
Wang et al.

(10) Patent No.: US 11,620,589 B2
(45) Date of Patent: Apr. 4, 2023

(54) TECHNIQUES TO FORECAST FINANCIAL DATA USING DEEP LEARNING

(71) Applicant: State Street Corporation, Boston, MA (US)

(72) Inventors: Dajun Wang, Zhejiang (CN); Qinxue Meng, Zhejiang (CN); Zhendi Chen, Hubei (CN)

(73) Assignee: State Street Corporation, Boston, MA (US)

( * ) Notice: Subject to any disclaimer, the term of this patent is extended or adjusted under 35 U.S.C. 154(b) by 260 days.

(21) Appl. No.: 16/767,291

(22) PCT Filed: Mar. 15, 2019

(86) PCT No.: PCT/CN2019/078230
§ 371 (c)(1),
(2) Date: May 27, 2020

(87) PCT Pub. No.: WO2020/186376
PCT Pub. Date: Sep. 24, 2020

(65) Prior Publication Data
US 2021/0224700 A1 Jul. 22, 2021

(51) Int. Cl.
*G06N 3/08* (2006.01)
*G06Q 10/04* (2023.01)
*G06K 9/62* (2022.01)
*G06V 10/75* (2022.01)

(52) U.S. Cl.
CPC .......... *G06Q 10/04* (2013.01); *G06K 9/6257* (2013.01); *G06K 9/6261* (2013.01); *G06N 3/08* (2013.01); *G06V 10/751* (2022.01)

(58) Field of Classification Search
CPC ... G06N 3/0445; G06V 10/751; G06K 9/6261
See application file for complete search history.

(56) References Cited

U.S. PATENT DOCUMENTS

2017/0364998 A1  12/2017  Rivtis et al.

FOREIGN PATENT DOCUMENTS

| CN | 106203731 A | 12/2016 |
| CN | 107481048 A | 12/2017 |
| CN | 107832897 A | 3/2018 |

OTHER PUBLICATIONS

Pai, Ping-Feng et al., A Hybrid ARIMA and Support Vector Machine Model in Stock Price Forecasting, Omega, Sep. 16, 2004, 9 pages.
International Search Report and Written Opinion dated Dec. 12, 2019 for international application No. PCT/CN2019/078239, 10 pages.

*Primary Examiner* — Sam Bhattacharya
(74) *Attorney, Agent, or Firm* — Goodwin Procter LLP

(57) ABSTRACT

The present disclosure describes techniques to forecast financial data using deep learning. These techniques are operative to transform time series data in a financial context into a machine learning model configured to predict future financial data. The machine learning model may implement a deep learning structure to account for a sequence-sequence prediction where a movement/distribution of the time series data is non-linear. The machine learning model may incorporate features related to one or more external factors affecting the future financial data. Other embodiments are described and claimed.

20 Claims, 10 Drawing Sheets

600

---

PARTITION TIME SERIES DATA INTO A FIRST SEQUENCE AND A SECOND SEQUENCE
602

---

USE THE FIRST SEQUENCE AND A NON-LINEAR DEEP LEARNING MODEL TO CONFIGURE PARAMETERS TO MODEL AN INTERNAL PATTERN
604

---

USE THE SECOND SEQUENCE AND A KERNEL FUNCTION TO CONFIGURE PARAMETERS TO MODEL AN EXTERNAL FACTOR
606

PARTITION A FIRST SEQUENCE INTO A FIRST SUB-SEQUENCE AND A SECOND SUB-SEQUENCE
702

USE THE FIRST SUB-SEQUENCE TO PREDICT THE SECOND SUB-SEQUENCE AND GENERATE A NEURAL NETWORK COMPRISING A SET OF PARAMETERS FOR A TREND COMPONENT AND A SEASONAL COMPONENT
704

USE A KERNEL FUNCTION TO MAP THE SECOND SEQUENCE TO A FEATURE SET AND CONVERT THE FEATURE SET INTO ANOTHER SET OF PARAMETERS FOR EXOGENOUS VARIABLES
706

BUILD A FORECASTING MODEL TO INCLUDE THE SET OF PARAMETERS TO MODEL AN INTERNAL PATTERN AND ANOTHER SET OF PARAMETERS TO MODEL AN EXTERNAL FACTOR
708

*FIG. 7*

TECHNIQUES TO FORECAST FINANCIAL DATA USING DEEP LEARNING

CROSS-REFERENCE TO RELATED APPLICATIONS

This application is a national phase claiming the benefit of and priority to International Patent Application No. PCT/CN2019/078230, entitled "TECHNIQUES TO FORECAST FINANCIAL DATA USING DEEP LEARNING", filed Mar. 15, 2019, which is hereby incorporated by reference in its entirety.

BACKGROUND

Companies and other organizations offer a variety of services for public and private consumption. Some of these services are economic services provided by the finance industry, encompassing a broad range of businesses that manage money, including credit unions, banks, credit-card companies, insurance companies, accountancy companies, consumer-finance companies, stock brokerages, investment funds, individual managers, and some government-sponsored enterprises. These services can provide a service user with a number of benefits in a financial context. Time series forecasting of financial data, such as stock market prediction and interest rate prediction, is an example of such a service.

Forecasting time series data, in general, is considered as one of the most difficult tasks in financial research and substantial investigation and development has been allocated towards developing effective techniques. Among the reasons explaining why forecasting any type of financial time series data is a difficult task, noise and other (volatile) extrinsic features impact the movement/distribution of the time series data. For example, political instability in a particular region may negatively impact stock prices for companies operating in that region. While many companies are devoting time and resources towards resolving these difficulties, conventional solutions, however, are deficient for a number of reasons including an inadequate representation of the features affecting the data being forecasted.

It is with respect to these and other considerations that the present improvements have been desired.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to forecast financial data using deep learning. Some embodiments are particularly directed to techniques to forecast financial time series data using deep learning for stock market/interest rate prediction. In one embodiment, for example, an apparatus may comprise a processing circuit and logic stored in computer memory and for execution on the processing circuit. The logic is operative to cause the processing circuit to process historical data into a first sequence and a second sequence. The historical data includes a time series dataset. The logic is operative to cause the processing circuit to build a machine learning model to include parameters by using the first sequence and a non-linear deep learning model to configure a portion of the parameters to model an internal pattern with respect to the time series dataset and using the second sequence and a kernel function to configure another portion of the parameters to model an external factor. The logic is operative to cause the processing circuit to generate forecast data from the machine learning model, the forecast data comprising a predicted value corresponding to a time slot occurring after the time series dataset. The logic is operative to cause the processing circuit to compare the predicted value with an actual value corresponding to the time slot and adjust at least one of the parameters based upon that comparison. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a second logic flow for the system of FIG. 1.

FIG. 7 illustrates an embodiment of a third logic flow for the system of FIG. 1.

DETAILED DESCRIPTION

Figure 1:
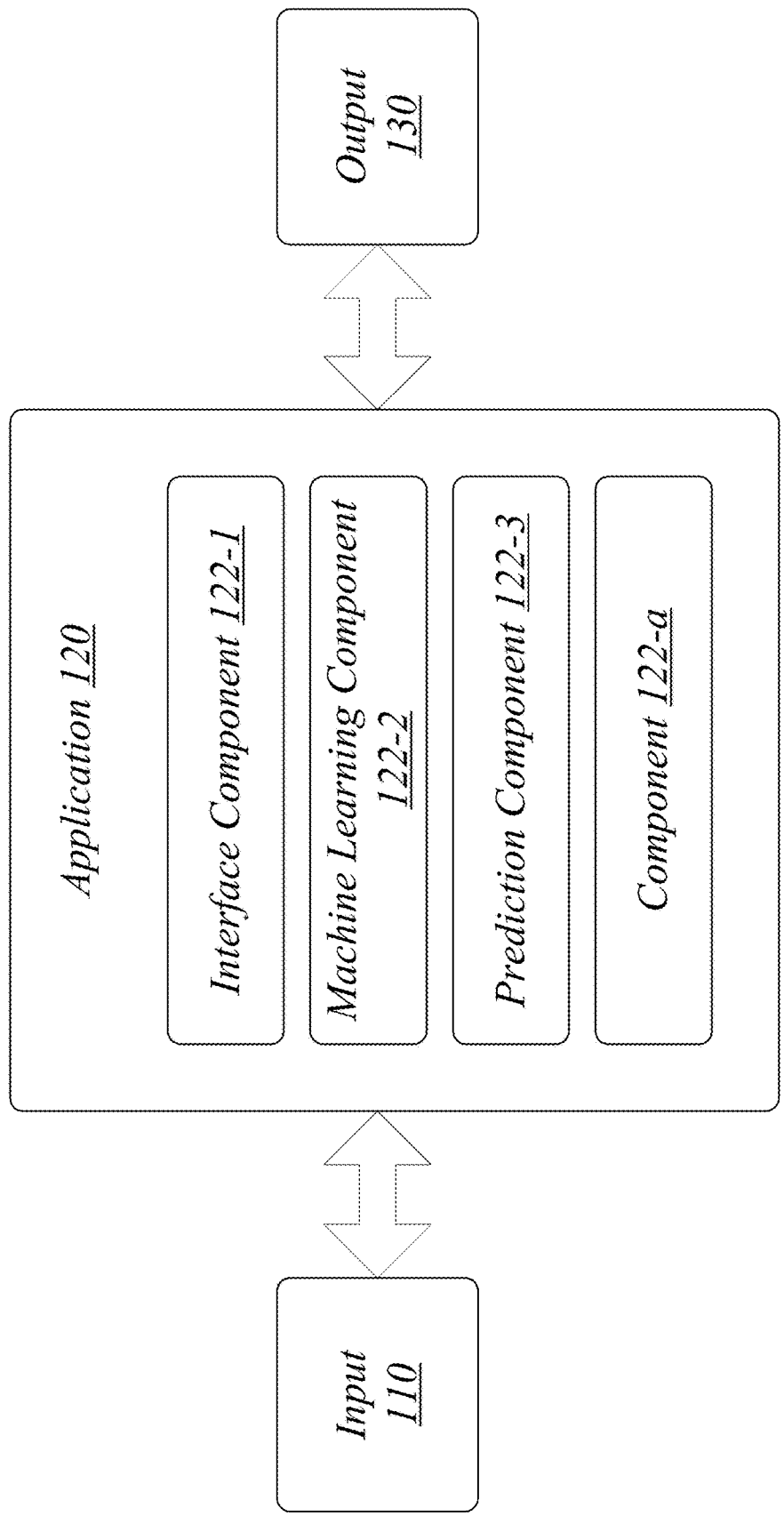
FIG. 1 illustrates an embodiment of a system to forecast financial data using deep learning.

Various embodiments are directed to techniques to forecast financial data using deep learning. The "financial data" being forecasted refers to time series data that include data points spanning a series of time slots.

As described herein, conventional forecasting techniques lack appropriate representation and accounting for external factors affecting the time series data being evaluated/forecasted. The movement or distribution of financial time series data is substantially affected by various features, such as one or more external factors and one or more internal (e.g., intrinsic) patterns. Conventional techniques for financial time series data forecasting do not account for the fact that both internal patterns and external factors are important. Some solutions leverage techniques appropriate for sensor data where internal patterns and external factors play little or no role. As a result, wavelet filters fail to work because these models overemphasize the impact of internal patterns. Traditional financial time-series models such as Autoregressive Integrated Moving Average (ARIMA) and Vector Autoregression (VAR) consider only a limited number of lags and ignore long-term internal patterns. Another drawback of these models is that they are generalized linear and have limited capabilities in representing non-linear internal patterns. For example, the movement of stock market prices may be affected more by the overall macro-economic factors, sector factors, news of issuers and their supply-demand situations than intrinsic internal values. While identifying the possible reasons may be difficult, modeling these factors can be accomplished because, in general, the movement of time-series data is a combined result of both internal patterns and external factors. The present disclosure describes the various embodiments as being operative to determine parameters for accurately modeling the internal patterns and external factors and in an appropriate balance.

The techniques described herein may provide a machine learning model with a neural network architecture and suitable parameters (e.g., weights/coefficients) to express the external factor(s) and internal pattern(s) equitably and accurately. When these parameters are mathematically combined with at least some of the time series data, any resulting value is a prediction for a time slot occurring after a last time slot of the time series data. Furthermore, these techniques assume a non-linear movement or distribution and for at least that reason, implement a non-linear deep learning model as the neural network architecture. The techniques implement a kernel function to transform some of the time series data into a feature set (of feature weights) corresponding to the external factor(s). The techniques described herein may covert that feature set into coefficients of a function (e.g., a polynomial function) for approximating the external factor(s) and their impact on the above-mentioned prediction. The parameters may be dynamic to account for differences in terms of business domains.

The techniques described herein may leverage solutions to sequence prediction problems, such as those implementing Long Short Term Memory networks (LSTM). LSTMs have a property of selectively remembering patterns for long durations of time. In some embodiments, the machine learning model described herein is implemented as a deep-SARIMAX (Seasonal Autoregressive Integrated Moving Average) model, which is an extensive SARIMAX model with an enhanced non-linear representation. This SARIMAX model explicitly models the internal patterns and external factors of financial time-series data by a non-linear sequence-to-sequence model on a long historical data and a generalized linear kernel function on a recent, short historical data, respectively. These embodiments have an advantage of the framework of SARIMAX to consider the time-dependence of time-series data combined with benefits of deep learning to represent a non-linear movement/progression. The embodiments provided herein may be applied to predict the daily movement of United States treasury, OAS changes and S&P500 movements.

Applying deep learning (which may also be known as deep sequential modeling) to financial time series data incurs many issues and obstacles. As one issue, a deep learning model treats irregular shifting of external factors as noise over a long time period. More importantly, conventional solutions only apply deep learning and do not resolve any of the issues associated with its application. The techniques described herein synthesize a non-linear sequential model and a generalized linear kernel function into the above-mentioned SARIMAX model as an overall optimization framework. This machine learning model is flexible and can be applied on different financial scenarios as it can automatically detect the split of a long sequential data for internal patterns and a short sequential data for external factors.

As a result, the embodiments can improve affordability, scalability, modularity, extendibility, or interoperability for an operator, device or network.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The processes presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a software application 120 comprising various components 122-a. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

As described above, the application 120 may be a software application, such as a web application operative on an Internet browser or a mobile application operative on a mobile device operating system. The application 120 may be generally arranged to process input 110 of which some input may be provided directly to an interface component 122-1 via an input device, and other input may be provided to the interface component 122-1 via a network. For example, a user may enter data via a keyboard device attached to a computing device running the application 120. The application 120 may be generally arranged to generate output 130 for the interface component 122-1 of which some output may be configured for display on a display device and other output may be communicated across the network to other devices. As an example, the application 120 may generate data that can be processed/rendered by the interface component 122-1 into content for a Graphical User Interface (GUI).

In some embodiments, the application 120 is operative to provide users with forecasting services in a particular field, such as financial (time series) data forecasting. The application 120 uses a machine learning model (i.e., a forecasting model) configured to transform historical time series data (e.g., financial data, such as stock market data or interest rates) into a prediction about future time series data. In some embodiments, the application 120 processes historical interest rate data over a series of time slots and computes a predicted interest rate (i.e., a label) for at least one time slot occurring after the series of time slots. In other embodiments, the application 120 processes historical stock prices over a series of time slots and predicts a stock market price for one or more upcoming time slots. Either computation relies upon the machine learning model being accurate and, as described herein, conventional techniques (e.g., other models) have a number of issues including some related to accuracy; however, the machine learning model being implemented in accordance with the present disclosure mitigates and/or resolves at least some (if not all) of the number of issues.

The application 120 may use a machine learning component 122-2 operative to build the machine learning model to accomplish the above-mentioned forecasting services. In some embodiments, the application 120 utilizes an implementation of the machine learning model that includes a configuration of various parameters. The application 120 may utilize an implementation of the machine learning model that is built from parameters assuming a non-linear distribution in the time series data. As described herein, at least some of these parameters are configured to model an internal pattern in terms of a trend component and a seasonal component. Such an implementation of the machine learning model may be built from parameters corresponding to a deep learning structure (e.g., a neural network). The application 120 may utilize an implementation of the machine learning model that is built from parameters representing exogenous variables with respect to the time series data. As described herein, at least some of these parameters are configured to model one or more external factors affecting the time series data. It is appreciated that such an implementation may combine parameters to model the internal pattern and parameters to model the external factor.

In accordance with a time series forecasting method (e.g., SARIMAX), one example implementation of the machine learning model is configured with parameters to model at least one internal pattern in terms of trends (i.e., the trend component) and seasonality (i.e., the seasonal component). The trend component and the seasonal component may represent the univariate time series data as a non-linear distribution in a repeating cycle. SARIMAX is an extension of the Autoregressive Integrated Moving Average (ARIMA) forecasting method and supports the time series data with both the trend component and the seasonal component as well as exogenous variables. Exemplary parameters (i.e., hyperparameters) to configure the machine learning model may include (with emphasis in italics): p for trend autoregression order; d for trend difference order; q for trend moving average order; P for seasonal autoregressive order; D for seasonal difference order; Q for seasonal moving average order; and m for the number of time steps for a single seasonal period. The trend component corresponds to parameters p, d, and q while the seasonal component corresponds to parameters P, D, Q, and m. A parameter of either the trend component and the seasonal component may refer to a function; in particular, the parameter may specify a maximum degree of a polynomial. For example, if the trend autoregression order p=2, a second-order polynomial function represents the autoregression of the time series data and, furthermore, that representation models a pattern in the non-linear progression in the time series data.

Another example implementation of the machine learning model is configured with parameters to model an internal pattern with a specific function or set of functions. According to one embodiment, some of the parameters specify coefficients for a polynomial function that models either autoregression, differencing, or a moving average. The parameters may be configured into a deep learning structure, such as a neural network (e.g., a long short term memory network). It is appreciated that while the present disclosure may describe the long short term memory network as a non-linear deep learning model, any suitable neural network architecture may be used for forecasting time series data within a financial context. The example implementation of the machine learning model is further configured with parameters to model an external factor as exogenous variables. The parameters to model the external factor may be weights representing the external factor's feature set in a heuristic function.

The application 120 may use a prediction component 122-3 to compute a predicted value for a time slot occurring after the historical time series data. The prediction component 122-3 uses the above-mentioned machine learning model (e.g., the forecasting model) to compute the predicted value, for example, by performing a weighted analysis of the historical time series data. The weighted analysis may utilize the model's parameters as weights/coefficients in a heuristic function and combine them with historical time series data to produce the predicted value. If the weighted analysis includes a non-linear polynomial function that receives, as input, the historical time series data, the non-linear polynomial function produces an accurate prediction for the next time slot.

Figure 2:
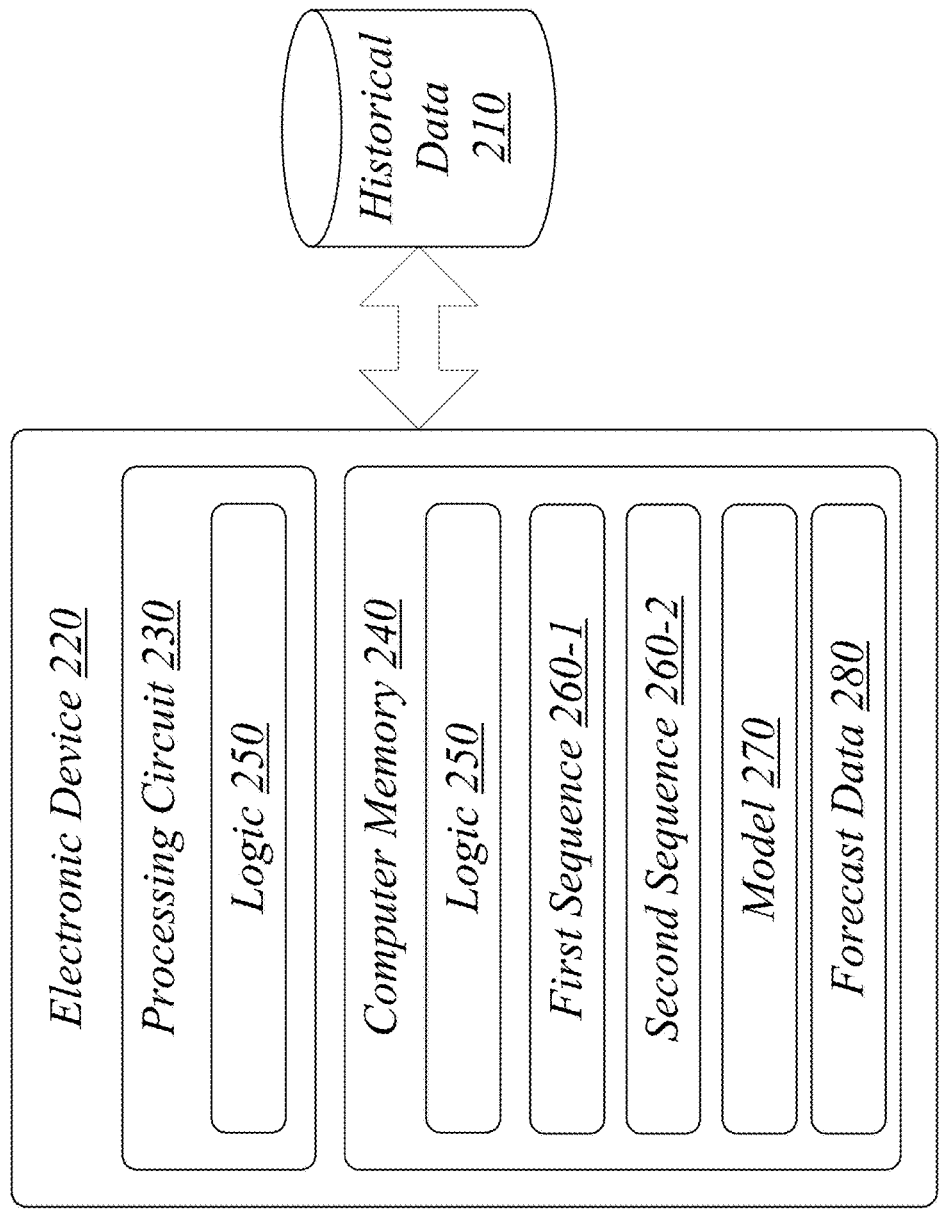
FIG. 2 illustrates an embodiment of an apparatus for the system of FIG. 1.

FIG. 2 illustrates an embodiment of an apparatus 200 for the system 100. As shown in FIG. 2, the apparatus 200 may be arranged into a single entity, an electronic 220, generally configured to process input and generate output.

The electronic device 220 includes a processing circuit 230 and computer memory 240 on which logic 250 is executed and stored, respectively. The logic 250 is operative to cause the processing circuit 230 to process historical data 210 into a first sequence 260-1 and a second sequence 260-2. The historical data 210 generally includes a time series dataset, such as historical financial data that is distributed over a period of time divided into time slots. Therefore, the first sequence 260-1 and the second sequence 260-2 each include time series data over a first set of time slots and a second set of time slots, respectively; in some instances, the first set of time slots precedes the second set of time slots but this not a requirement.

The logic 250 is further operative to cause the processing circuit 230 to build a model 270 (i.e., a forecasting model) having parameters. The model 270, in general, implements a neural network architecture that relies upon the parameters to process sequence data as input and produce label data as output. In some embodiments, the model 270 configures the parameters into a set of polynomial functions that, when combined, compute a predicted value for a future time slot (e.g., a next time slot) of any input time series data.

The logic 250 uses the first sequence 260-1 and a non-linear deep learning model to configure a portion of the parameters to model an internal pattern with respect to the time series dataset. The non-linear deep learning model as described herein refers to a neural network in which the portion of the parameters form coefficients of a polynomial function with a term having a maximum degree of at least two (2). The logic 250 uses the second sequence and a kernel function to configure another portion of the parameters to model an external factor. As described herein, the logic 250 executes the kernel function to transform the second sequence 260-2 into a feature set describing the external factor to model. In some embodiments, that feature set includes weights that are used for the other portion of the parameters. In other embodiments, the logic 250 is operative to convert the feature set into the other portion of the parameters, for example, via normalization and/or model fitting.

The logic 250 is further operative to cause the processing circuit 230 to generate forecast data 280 from the model 270. The forecast data 280 includes at least one predicted value corresponding to a time slot occurring after the time series dataset. In some embodiments, the forecast data 280 may predict a sequence of financial data points for a future time period, such as future interest rates or future stock market prices. The logic 250 may use the parameters of the model 270 as weights in a weighted analysis of the time series dataset. A portion of the parameters are configured to model at least one internal pattern characterizing the time series dataset and another portion of the parameters are configured to model at least one external factor affecting the time series dataset. It is appreciated that having the parameters to model both the internal pattern and the external factor provides considerable benefit, for example, by enhancing efficiency and accuracy in any prediction made from the historical data 210. In addition, modelling the internal pattern in a deep learning structure (e.g., a neural network) conserves a considerable amount of time and resources. The present disclosure further describes a benefit from configuring at least some of the parameters to assume a non-linear progression of any future time series data.

Figure 3:
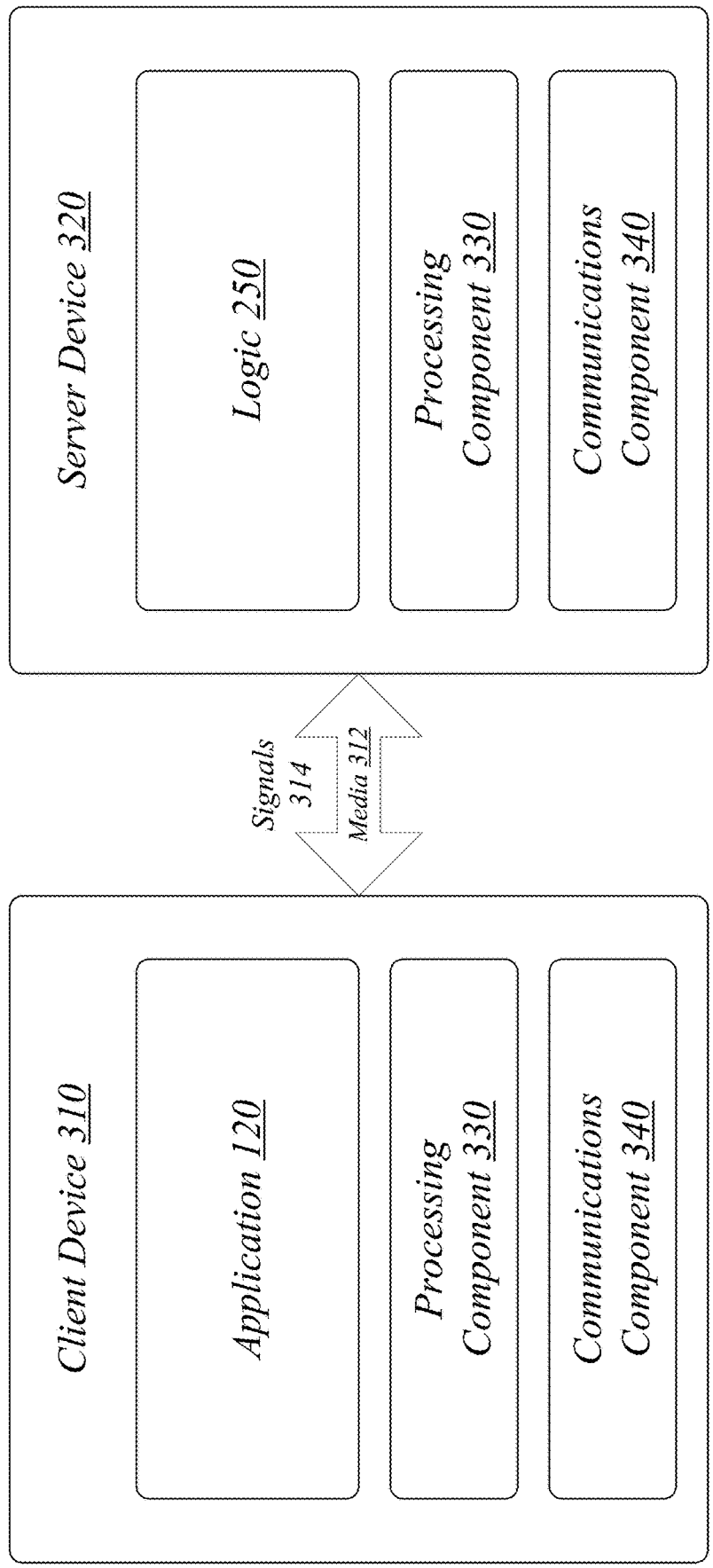
FIG. 3 illustrates an embodiment of a distributed model for the system of FIG. 1.

FIG. 3 illustrates a block diagram of a distributed model 300 for the system 100. The system 100 may be arranged into the distributed model 300 that distributes portions of the structure and/or operations for the system 100 across multiple computing entities. Examples of distributed model may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context. As an alternative, the distributed model 300 may implement some or all of the structure and/or operations for the system 100 in a single computing entity, such as entirely within a single electronic device.

The distributed system 300 may comprise a client device 310 and a server device 350. In general, the client device 310 and the server device 350 may be the same or similar to the apparatus 200 as described with reference to FIG. 2.

The client device 310 may comprise or employ one or more client programs that operate to perform various methodologies in accordance with the described embodiments. In one embodiment, for example, the client device 310 may implement the application 120 of FIG. 1 as a web application or a mobile application.

The server device 350 may comprise or employ one or more server programs that operate to perform various methodologies in accordance with the described embodiments. In one embodiment, for example, the server device 350 may implement the logic 250 of FIG. 2.

Each of the devices 310, 350 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The devices 310, 350 may execute processing operations or logic for the system 100 using a processing component 330. The processing component 330 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, processes, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The devices 310, 350 may execute communications operations or logic for the system 100 using communications component 340. The devices 310, 350 may communicate over a communications media 314 using communications signals 312 via the communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 312 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

As an alternative, a centralized model may implement some or all of the structure and/or operations for the system 100 in a single computing entity, such as entirely within a single electronic device. The electronic device may communicate with other devices over a communications media using communications signals via a communications component. The other devices may be internal or external to the electronic device as desired for a given implementation.

Figure 4:
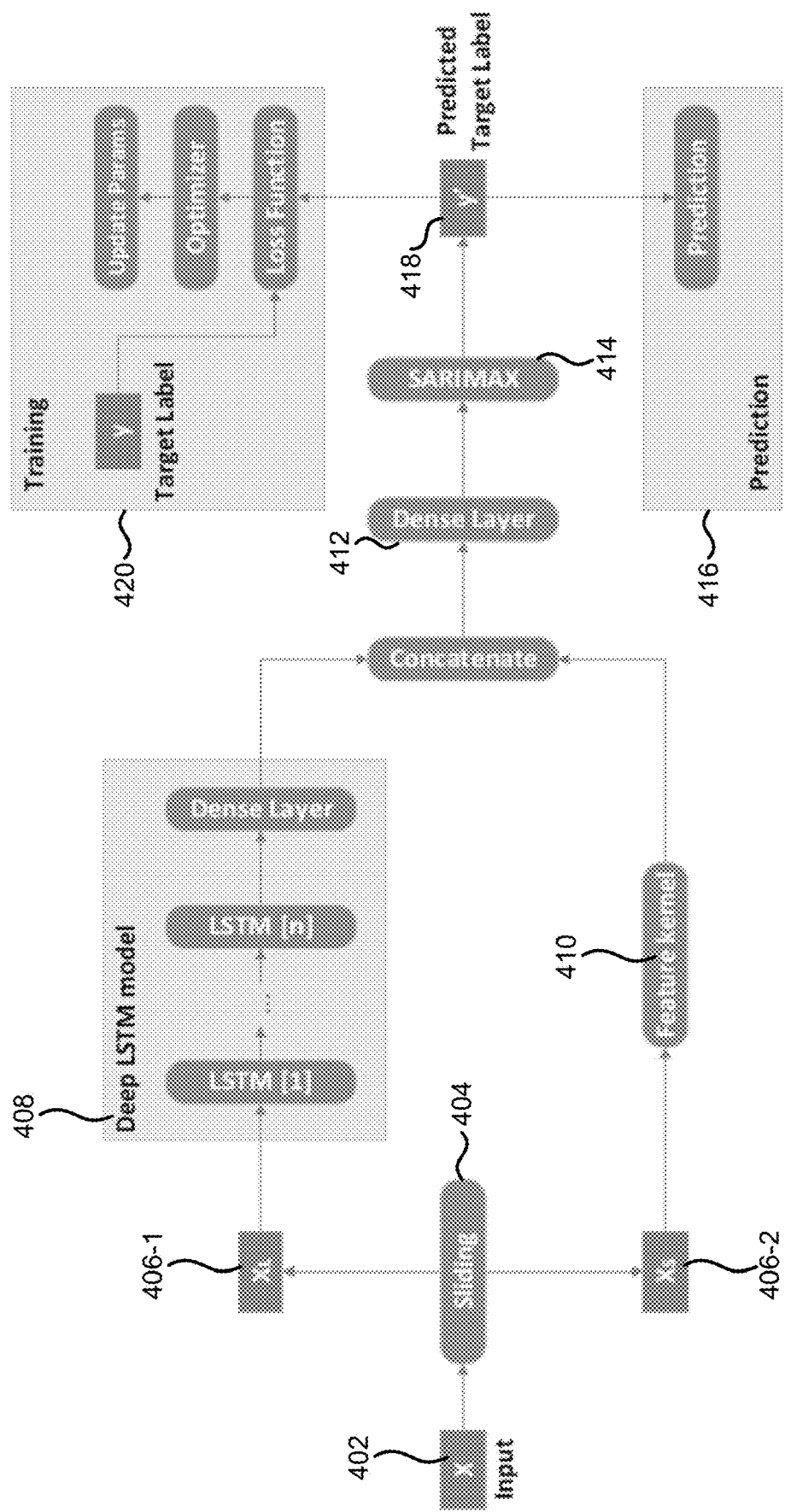
FIG. 4 illustrates an embodiment of a forecasting technique implemented by the system of FIG. 1.

FIG. 4 illustrates an embodiment of a forecasting technique 400 for the system 100. As shown in FIG. 4, the forecasting technique 400 initiates machine learning model training by accepting, as input, time series data 402 from a data source. The time series data 402 may represent a time period of historical financial data, including a series of time slots forming a sliding window 404. The forecasting technique 400 defines the sliding window 404 by a size constraint and a demarcation line separating sequences of the historical financial data. The forecasting technique 400 uses the sliding window 404 to train a non-linear deep learning model. If further training is needed, the forecasting technique 400 shifts the sliding window 404 by a number of time slots.

The non-linear deep learning model referred to herein may be a deep-SARIMAX model. In at least one example implementation, the deep-SARIMAX model includes a SARIMAX univariate forecasting method with at least some parameters in a deep learning structure (e.g., a neural network) to model an internal pattern with respect to the time series data and at least one parameter to model an external factor with respect to the time series data. The parameters in the deep learning structure may model the non-linear internal pattern in at least one second-order polynomial function.

In general, SARIMAX is a SARIMA (Seasonal Autoregressive Integrated Moving Average) implementation that supports exogenous variables (e.g., as parameters). SARIMA itself is an extension of ARIMA (i.e., a forecasting method that can handle univariate time series data with a trend component), explicitly supporting univariate time series data with a seasonal component. Hence, the SARIMAX method described herein includes at least three components (e.g., the trend component, the seasonal component, the exogenous variables) and each component includes a set of hyperparameters. The trend component, the seasonal component, both the seasonal component and the trend component may be represented/modeled in the deep-learning structure. The exogenous variables may utilize the kernel function to project its values into two-dimensional space.

For the trend component, the hyperparameters relate to the following: Autoregression (AR), which leverages the dependent relationship between an observation and some number of lagged observations; Integrated (I), which relates to differencing of raw observations (e.g. subtracting an observation from an observation at the previous time step) in order to make the time series stationary; and Moving Average (MA), which relates to the dependency between an observation and a residual error from a moving average model applied to lagged observations. In some embodiments, the trend component includes a trend autoregression order, a trend difference order, and a trend moving average order as some of the hyperparameters. The forecasting technique 400 may define the trend autoregression order as a number of lag observations included in the model, the trend difference order as a number of times that the raw observations are differenced, and the trend moving average as a size of the moving average window.

For the seasonal component, the hyperparameters specify the autoregression (AR), differencing (I) and moving average (MA) of the series as well as a period of the seasonality. The seasonal component may consist of terms/coefficients that are same or similar to the non-seasonal components of the model but for backshifts of the seasonality period. In some embodiments, the seasonal component includes a seasonal autoregressive order, a seasonal difference order, a seasonal moving average order, and a number of time steps for a single seasonal period as some of the hyperparameters. SARIMAX and SARIMA methods use differencing at a lag equal to the number of seasons (s) to remove additive seasonal effects.

In operation, the forecasting technique 400 uses the time series data 402 to create a set of parameters for the deep learning structure and another step of parameters for the exogenous variables. The forecasting technique 400 partitions the time series data 402 into a first sequence 406-1 and a second sequence 406-2 and then, communicates the first sequence 406-1 to a deep LSTM model 408 and the second sequence to a kernel function 410. The deep LSTM model 408 uses a first portion of the first sequence 406-1 to predict a second portion of the first sequence 406-1 and determines the set of parameters for making that prediction. The deep LSTM model 408 may organize the determined set of parameters into at least part of the deep learning structure.

As an example, the deep LSTM model 408 includes a neural network architecture whose nodes represent the determined set of parameters.

The kernel function 410 determines a feature set for each external factor and converts the feature set into another set of parameters. Each feature of the feature set refers to a quantification of some quality, typically with some established metric for measuring the quality. The feature set may include numeric values and, via the kernel function 410, those values are mapped to another (i.e., higher) dimension. As described herein, the feature set corresponds to external factors affecting the time series data 402 and a subset of the feature set corresponds to a specific external factor. The kernel function 410 translates the feature subset into a parameter representing the specific external factor amongst the other set of parameters. As an example, the kernel function 410 may map values of a subset of the feature set to a single value representing the entire feature subset such that the single value becomes a parameter of the other set of parameters. Hence, the kernel function 410 generates an abstraction of the feature sub-set into a single variable, enabling a univariate analysis and forecasting. The kernel function 410 further operates a similarity function over groups of data points in the feature set.

As shown in FIG. 4, the forecasting technique 400 includes a step operative to concatenate both sets of parameters, ultimately resulting in an improved non-linear deep learning model. The forecasting technique 400 applies a dense layer 412 to normalize output from the deep LSTM model 408 and the kernel function 410 before being feed into SARIMAX 414. In general, the SARIMAX 414 refers to layer/step in the forecasting technique 400 where a SARIMAX forecasting method/model is instantiated.

As input for the SARIMAX model, the forecasting technique 400 provides, as parameters for the trend component and seasonal component, the normalized set of parameters having the deep learning structure. In some embodiments, the deep LSTM model 408 generates an autoregression polynomial, a differencing polynomial order, and a moving average polynomial for each of the trend component and the seasonal component. As further input for the SARIMAX model at the SARIMAX 414, the forecasting technique 400 provides, as the exogenous variables, the normalized other set of parameters for the external factors.

For the trend component and/or the seasonal component, the forecasting technique 400 may define a deterministic polynomial function to model the internal pattern in a non-linear distribution. The forecasting technique 400 may use the parameters in the deep learning structure as coefficients for the deterministic polynomial function. In some embodiments, the forecasting technique 400 defines the deterministic polynomial function as a combination of functions used for AR, I, and MA.

Based upon the time series data 402 (which spans time between a first time slot and a last time slot), the forecasting technique 400 uses the concatenated parameters in a prediction process 416 to compute value for a predicted target label 418 of a time slot after the last time slot in the time series data 402. When the next time slot becomes a present point-in-time, the forecasting technique 400 invokes a training process 420 to update the parameters. In the training process 420, the forecasting technique 400 uses an optimizer to identify a target label as an optimal value for comparison with the predicted target label 418. The training process 420 uses a loss function to compare the target label with the predicted target label 418 to produce a comparison result having a difference value. Then, the training process 420 invokes an optimizer to use the difference value to update the concatenated parameters of the SARIMAX model until the loss is converged.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
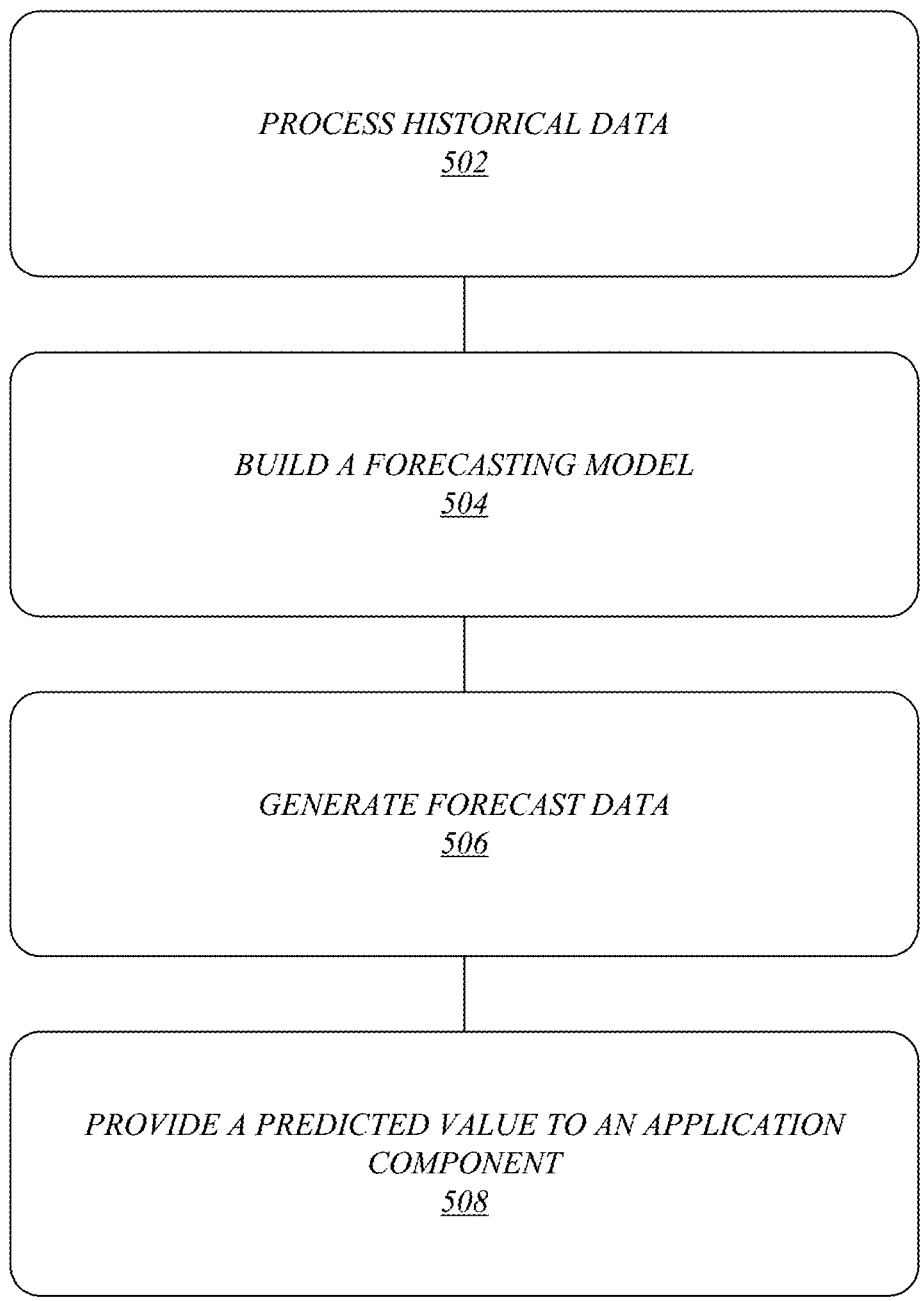
FIG. 5 illustrates an embodiment of a first logic flow for the system of FIG. 1.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 processes historical data at block 502. The historical data includes time series data in a particular context (e.g., a financial context) and, as an example, the logic flow 500 may partition a portion of the time series data into a first sequence spanning a first time period and a second sequence spanning a second time period. The first time period and the second time period may be consecutive, forming a window into the historical data; alternatively, the first time period and the second time period may be disjointed. Together, the first sequence and the second sequence do not exceed a size constraint. The logic flow 500 may enforce the size constraint to optimize resource allocation/utilization and prevent excessive processing time/storage space.

The logic flow 500 builds a forecasting model at block 504. The logic flow 500 may use the first sequence in training a non-linear deep learning model to determine a set of parameters to model an internal pattern corresponding to a distribution of that historical data. In some embodiments, the non-linear deep learning model is a long short term memory network and the logic flow 500 arranges the parameters into a neural network to model a non-linear progression of the historical data.

The logic flow 500 may use a kernel function and the second sequence to determine another set of parameters. These parameters, in general, are operative to model or represent various features corresponding to an external factor (e.g., stock market volatility) corresponding to the historical data. In some embodiments, a given parameter may denote a weight (e.g., a level of importance) attributed to a specific feature value derived by some metric for quantifying that feature. The logic flow 500 combines the set of parameters and the other set of parameters to build the forecasting model. The logic flow 500 further trains the forecasting model by generating a predicted value, comparing the predicted value with an actual value, and adjusting at least one parameter to fit the forecasting model to the historical data plus the predicted value.

The logic flow 500 generates forecast data at block 506. For example, the logic flow 500 applies the forecasting model to the historical data to predict at least one data point occurring after the time series dataset in the historical data. The parameters associated with modeling the internal pattern and/or the parameters associated with modeling the external factor may refer to weights that when combined with values for the time series data in a function, result in a label for a next time slot after a last time slot of in the time series dataset of the historical data. In some embodiments, the parameters configured to model the internal pattern may refer to coefficients in a set of polynomial functions where the time series data is the variable. Some parameters translate directly into their associated coefficients while other parameters require a mathematical process to produce their associated coefficients.

The logic flow 500 provides a predicted value to an application component at block 508. In an embodiment where an application provides a forecasting service, the application component uses the predicted value to perform a task. The embodiments provided herein may be applied to predict the daily movement of United States (US) treasury bonds, OAS changes and S&P500 movements. The embodiments are not limited to this example.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 partitions time series data into a first sequence and a second sequence at block 602. For example, the first sequence and the second sequence of the time series data store two sequences of financial data points over a series of time slots, such as stock market prices or interest rates. In some embodiments, the first sequence and the second sequence are adjacent and form a sliding window, which refers to a particular series of time slots that is appropriate for building a machine learning model. As actual time elapses, the sliding window shifts by an equal number of time slots. While the second sequence may immediately follow the first sequence in time, in other embodiments, there is no such constraint. The logic flow 600 may establish a constraint for a total number of time slots in the series of time slots. One example constraint may be a limit of a size of the sliding window of the time series data.

The logic flow 600 uses the first sequence and a non-linear deep learning model to configure parameters to model an internal pattern at block 604. In some embodiments, the logic flow 600 partitions the first sequence of the time series data into a first sub-sequence and a second sub-sequence and then, uses the first sub-sequence and the non-linear deep learning model to make a prediction about the second sub-sequence. The parameters may be used in a heuristic function (e.g., as coefficients) to predict the second sub-sequence. The non-linear deep learning model arranges the parameters into a deep learning structure (e.g., a neural network). Having the second sub-sequence of actual financial data points enables the logic flow 600 to determine a level of accuracy of such a prediction. Based upon a comparison between the predicted second sub-sequence and the actual second sub-sequence, the logic flow 600 determines an appropriate set of parameters by adjusting the deep learning structure. As described herein, that adjustment allows the non-linear deep learning model to better predict a sequence of future financial data.

The logic flow 600 uses the second sequence and a kernel function to configure parameters to model an external factor at block 606. Similar to the above-mentioned parameters to model the internal pattern, the parameters may be used (e.g., as coefficients) in a function to predict the external factor's impact on the future financial data. The logic flow 600 may determine the parameters that approximate an effect of the external factor on the time series data; and once the resulting parameters are deemed accurate for modeling/representing the external factor, the logic flow 600 applies these parameters in a forecasting model to predict a next data point for the time series data. In some embodiments, the logic flow 600 uses the parameters to model the internal pattern to compute a preliminary label (e.g., a preliminary prediction of the next data point) and uses the parameters to model the external factor to adjust the preliminary label and compute the next data point. It is appreciated that such an adjustment accounts for the external factor's effect on the next data point. If the time series data includes stock market prices and the preliminary label refers to a preliminary estimate of a future stock price, the parameters to model the external factor (e.g., environmental/political volatility) adjusts the preliminary estimate and computes an accurate future stock price (e.g., tomorrow's stock price).

In some embodiments, the logic flow 600 moves the sliding window by a specific number of time slots after determining the parameters to model the internal pattern and the parameters to model the external factor and then, repeats blocks 602, 604, and 606 in continuation of the forecasting technique (e.g., the forecasting technique 400 of FIG. 4). The embodiments are not limited to this example.

FIG. 7 illustrates one embodiment of a logic flow 700. The logic flow 700 may be representative of some or all of the operations executed by one or more embodiments described herein.

The logic flow 700 depicts steps to build a forecasting model, such as a deep-SARIMAX model. In the illustrated embodiment shown in FIG. 7, the logic flow 700 partitions a first sequence into a first sub-sequence and a second sub-sequence at block 702. The first sequence may refer to a sequence of historical time series data. The logic flow 700 uses the first sub-sequence to predict the second sub-sequence and generate a neural network comprising a set of (machine learning model) parameters for a trend component and a seasonal component of the deep-SARIMAX model at block 704. The block 702 and the block 704, together, form an embodiment of block 604 of FIG. 6, which is to use the first sequence of historical time series data to configure the set of parameters to model an internal pattern in the historical time series data. As described herein, the logic flow 700 may perform the embodiment of block 604 to train a non-linear deep learning model having a neural network architecture, such as a long short term memory network. In some embodiments, the logic flow 700 uses the first sub-sequence to (partially) train the non-linear deep learning model, uses the non-linear deep learning model to generate a predicted sub-sequence, compare the predicted sub-sequence with the second sub-sequence to produce a comparison result, and adjust the non-linear deep learning model based upon the comparison result The logic flow 700 uses a kernel function to map a second sequence into a feature set and then, converts that feature set into another set of parameters for exogenous variables at block 706. The second sequence refers to another sequence of the historical time series data. The block 706 is an embodiment of block 606 of FIG. 6, which is to use the second sequence of historical time series data to configure the other set of parameters model an external factor in the historical time series data. The logic flow 700 converts the feature set into another set of parameters, for example, by normalizing the feature set into coefficients and adjusting the coefficients to predict the external factor's impact on the historical time series data. The logic flow 700 builds the forecasting model to include the set of parameters to model the internal pattern and the other set of parameters to model the external factor. The embodiments are not limited to this example.

Figure 8:
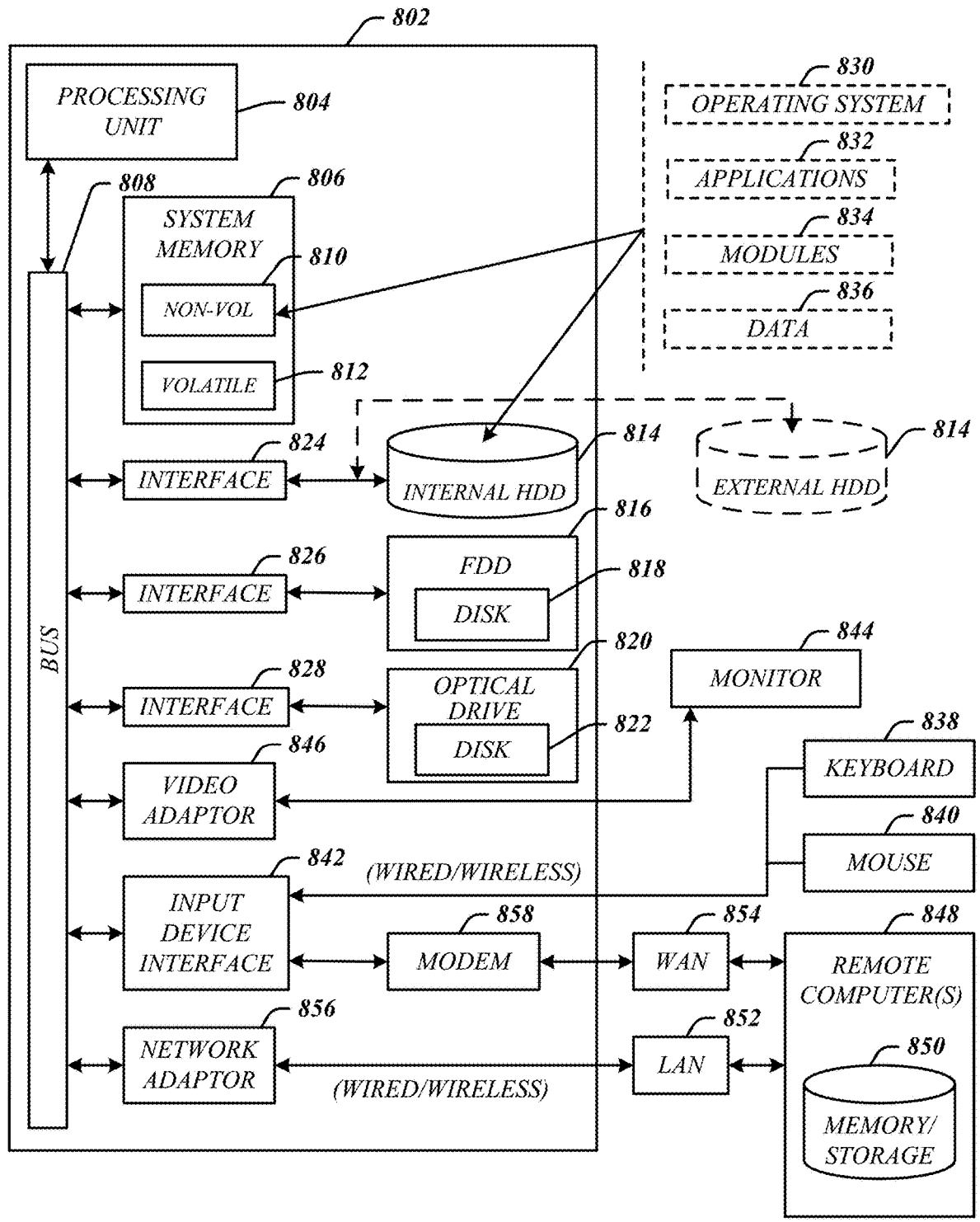
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIGS. 2-3, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
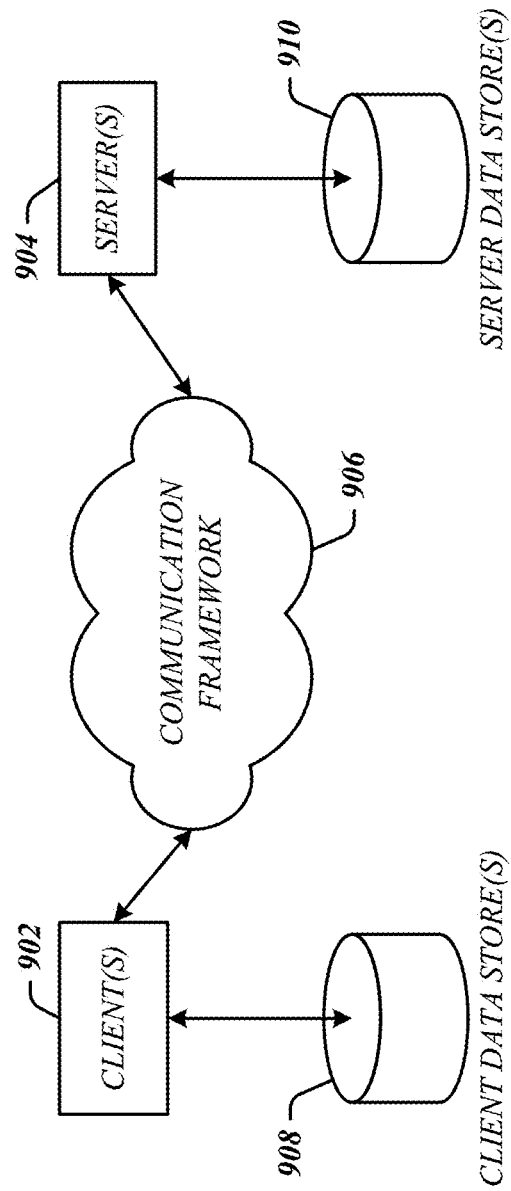
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the device 310. The servers 904 may implement the device 350. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
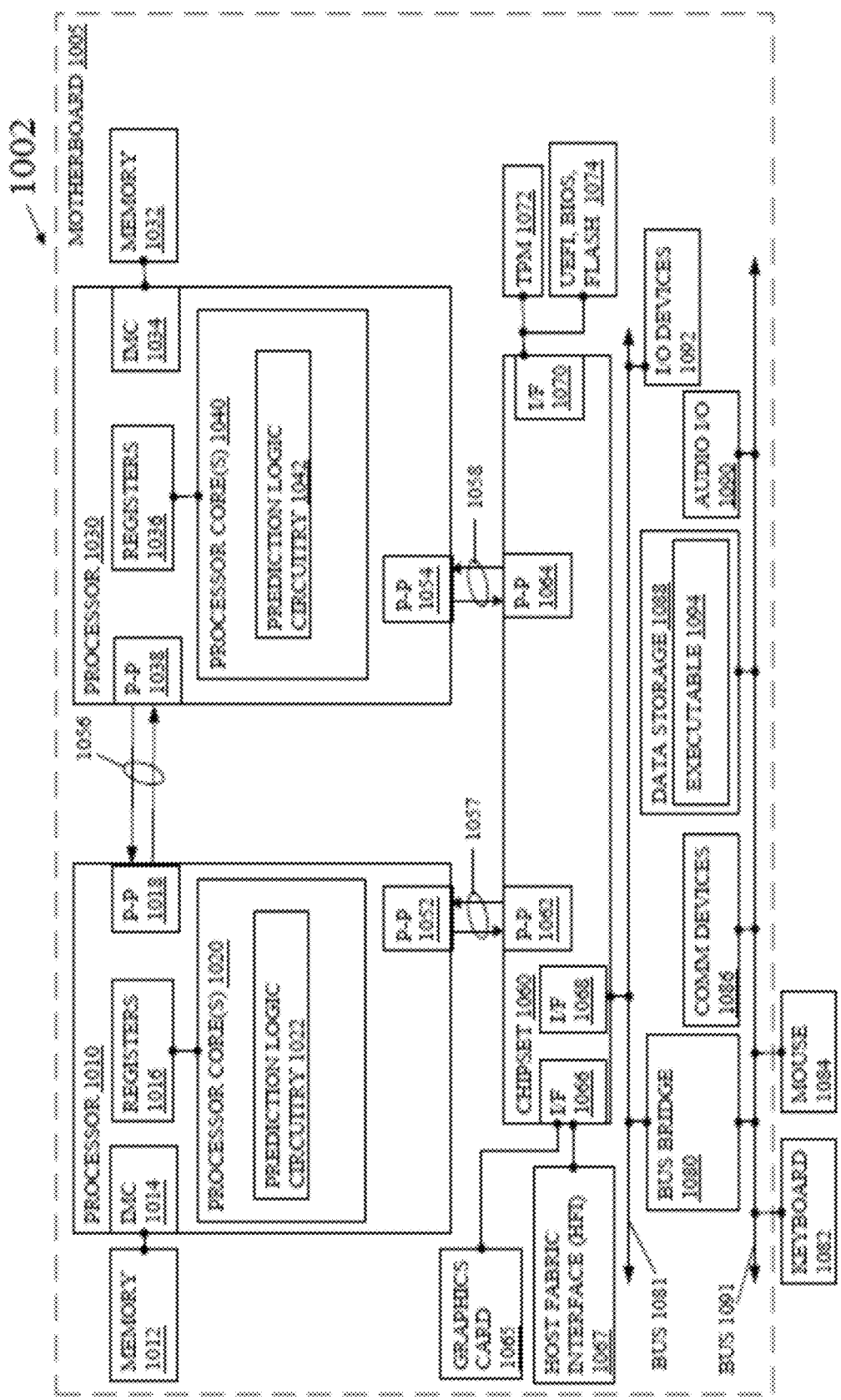
FIG. 10 illustrates an alternative embodiment of a computing architecture.

FIG. 10 illustrates an embodiment of a system 1000 having a computer 1002. The computer 1002 is an alternative embodiment of the computer 802 of FIG. 8. The system 1000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 1000 may have a single processor with one core or more than one processor. Note that the term "processor" refers to a processor with a single core or a processor package with multiple processor cores.

As shown in FIG. 10, system 1000 comprises a motherboard 1005 for mounting platform components. The motherboard 1005 is a point-to-point interconnect platform that includes a first processor 1010 and a second processor 1030 coupled via a point-to-point interconnect 1056 such as an Ultra Path Interconnect (UPI). In other embodiments, the system 1000 may be of another bus architecture, such as a multi-drop bus. Furthermore, each of processors 1010 and 1030 may be processor packages with multiple processor cores including processor core(s) 1020 and 1010, respectively. While the system 1000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 1010 and the chipset 1060. Some platforms may include additional components and some platforms may only include sockets to mount the processors and/or the chipset.

In some embodiments, the processor core(s) 1020 and 1040 may comprise prediction logic circuitry 1022 and 1042 such as the logic 250 described in conjunction with FIG. 2s. 1C and 2. The prediction logic circuitry may comprise processing circuitry configured for perform the operations described for the processing circuit 230 and the processing component 330 described in conjunction with FIGS. 2 and 3, respectively.

The first processor 1010 includes an integrated memory controller (IMC) 1014 and point-to-point (P-P) interfaces 1018 and 1052. Similarly, the second processor 1030 includes an IMC 1034 and P-P interfaces 1038 and 1054. The IMC's 1014 and 1034 couple the processors 1010 and 1030, respectively, to respective memories, a memory 1012 and a memory 1032. The memories 1012 and 1032 may be portions of the main memory (e.g., a dynamic random-access memory (DRAM)) for the platform (such as the main memory 478 in FIG. 4) such as double data rate type 3 (DDR3) or type 4 (DDR4) synchronous DRAM (SDRAM). In the present embodiment, the memories 1012 and 1032 locally attach to the respective processors 1010 and 1030. In other embodiments, the main memory may couple with the processors via a bus and shared memory hub.

The processors 1010 and 1030 comprise caches coupled with each of the processor core(s) 1020 and 1040, respectively. The first processor 1010 couples to a chipset 1060 via P-P interconnects 1052 and 1062 and the second processor 1030 couples to a chipset 1060 via P-P interconnects 1054 and 1064. Direct Media Interfaces (DMIs) 1057 and 1058 may couple the P-P interconnects 1052 and 1062 and the P-P interconnects 1054 and 1064, respectively. The DMI may be a high-speed interconnect that facilitates, e.g., eight Giga Transfers per second (GT/s) such as DMI 3.0. In other embodiments, the processors 1010 and 1030 may interconnect via a bus.

The chipset 1060 may comprise a controller hub such as a platform controller hub (PCH). The chipset 1060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1060 may comprise more than one controller hub such as a chipset with a memory controller hub, a graphics controller hub, and an input/output (I/O) controller hub.

In the present embodiment, the chipset 1060 couples with a trusted platform module (TPM) 1072 and the UEFI, BIOS, Flash component 1074 via an interface (I/F) 1070. The TPM 1072 is a dedicated microcontroller designed to secure hardware by integrating cryptographic keys into devices. The UEFI, BIOS, Flash component 1074 may provide pre-boot code.

Furthermore, chipset 1060 includes an I/F 1066 to couple chipset 1060 with a high-performance graphics engine, graphics card 1065 and a host fabric interface (HFI) 1067. The I/F 1066 may be, for example, a Peripheral Component Interconnect-enhanced (PCI-e). The HFI 1067 may include a network interface to couple the system 1000 with a connectivity fabric such as the connectivity fabric 103 in FIG. 1A. The HFI 1067 may be a network interface card (NIC) coupled with the system 1000 or may comprise a portion of an integrated circuit of the chipset 1060 or of a processor such as the processor 1010 and/or the processor 1030. The HFI 1067 may interface the system 1000 with other systems or storage devices such as the apparatus 200 illustrated in FIG. 2 via a connectivity fabric such as Fibre Channel or the like.

Various I/O devices 1092 couple to the bus 1081, along with a bus bridge 1080 which couples the bus 1081 to a second bus 1091 and an I/F 1068 that connects the bus 1081 with the chipset 1060. In one embodiment, the second bus 1091 may be a low pin count (LPC) bus. Various devices may couple to the second bus 1091 including, for example, a keyboard 1082, a mouse 1084, communication devices 1086, and a data storage unit 1088 that may store code. Furthermore, an audio I/O 1090 may couple to second bus 1091. Many of the I/O devices 1092, the communication devices 1086, and the data storage unit 1088 may reside on the motherboard 1005 while the keyboard 1082 and the mouse 1084 may be add-on peripherals. In other embodiments, some or all the I/O devices 1092, communication devices 1086, and the data storage unit 1088 are add-on peripherals and do not reside on the motherboard 1005. In some embodiments, the data storage unit 1088 may comprise a prediction executable 1094 that can execute of a processor core such as the processor core(s) 1020 and 1040 to configure prediction logic circuitry 1022 and 1042.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising: a processing circuit; and
logic stored in computer memory and executed on the processing circuit, the logic operative to cause the processing circuit to:
process historical data into a first sequence and a second sequence, the historical data comprising a time series dataset;
build a forecasting model having parameters by using the first sequence and a non-linear deep learning model to configure a portion of the parameters to model an internal pattern with respect to the time series dataset and using the second sequence and a kernel function to configure another portion of the parameters to model an external factor with respect to the time series dataset; and
generate forecast data from the forecasting model, the forecast data comprising a predicted value corresponding to a time slot occurring after the time series dataset.

2. The apparatus of claim 1, comprising logic operative to cause the processing circuit to compare the predicted value with an actual value at the time slot and adjust the parameters based upon comparing the predicted value with the actual value.

3. The apparatus of claim 1, comprising logic operative to cause the processing circuit to partition the first sequence into a first sub-sequence and a second sub-sequence.

4. The apparatus of claim 3, comprising logic operative to cause the processing circuit to train the non-linear deep learning model using the first sub-sequence to predict the second sub-sequence.

5. The apparatus of claim 4, comprising logic operative to cause the processing circuit to train the non-linear deep learning model using the first sub-sequence, use the non-linear deep learning model to generate a predicted sub-sequence, compare the predicted sub-sequence with the second sub-sequence to produce a comparison result, and adjust the non-linear deep learning model based upon the comparison result.

6. The apparatus of claim 1, comprising determining the other portion of the parameters by using the kernel function to map the second sequence to a feature set and converting the feature set into the other portion of the parameters.

7. The apparatus of claim 1, the forecast data comprising another time series dataset starting at the timeslot.

8. A computer-implemented method executed on a processing circuit, the method comprising:
processing historical data into a first sequence and a second sequence, the historical data comprising a time series dataset;
building a forecasting model to include a set of parameters to model an internal pattern with respect to the time series dataset and another set of parameters to model an external factor with respect to the time series dataset, the building comprising:
using a non-linear deep learning model to determine the set of parameters from the first sequence; and
using a kernel function to determine the other set of parameters from the second sequence; and
generating forecast data from the non-linear deep learning model, the forecast data comprising a predicted value corresponding to a time slot occurring after the time series dataset.

9. The computer-implemented method of claim 8 comprising comparing the predicted value with an actual value and updating the parameters.

10. The computer-implemented method of claim 8, comprising partitioning the first sequence into a first sub-sequence and a second sub-sequence.

11. The computer-implemented method of claim 10, comprising train the non-linear deep learning model using the first sub-sequence and the second sub-sequence.

12. The computer-implemented method of claim 10, comprising train the non-linear deep learning model using the first sub-sequence, use the non-linear deep learning model to generate a predicted sub-sequence, compare the predicted sub-sequence with the second sub-sequence to produce a comparison result, and adjust the non-linear deep learning model based upon the comparison result.

13. The computer-implemented method of claim 8, comprising determining the other portion of the parameters using a kernel function to map the second sequence to a feature set.

14. The computer-implemented method of claim 8, the forecast data comprising another time series dataset starting at the timeslot.

15. At least one non-transitory computer-readable storage medium comprising instructions that, when executed, cause a system to:
   process historical data into a first sequence and a second sequence, the historical data comprising a time series dataset;
   build a forecasting model having parameters by using the first sequence to train a non-linear deep learning model comprising a portion of the parameters to model an internal pattern with respect to the time series dataset and by using the second sequence to configure another portion of the parameters to model an external factor with respect to the time series data; and
   generate forecast data from the forecasting model, the forecast data comprising a predicted value corresponding to a time slot occurring after the time series dataset.

16. The non-transitory computer-readable storage medium of claim 15, the other portion of the parameters corresponding to a neural network.

17. The non-transitory computer-readable storage medium of claim 15, comprising instructions that when executed cause the system to: partition the first sequence into a first sub-sequence and a second sub-sequence.

18. The non-transitory computer-readable storage medium of claim 17, comprising instructions that when executed cause the system to: train the non-linear deep learning model using the first sub-sequence and the second sub-sequence.

19. The non-transitory computer-readable storage medium of claim 17, comprising instructions that when executed cause the system to: train the non-linear deep learning model using the first sub-sequence, use the non-linear deep learning model to generate a predicted sub-sequence, compare the predicted sub-sequence with the second sub-sequence to produce a comparison result, and adjust the non-linear deep learning model based upon the comparison result.

20. The non-transitory computer-readable storage medium of claim 15, comprising instructions that when executed cause the system to: determining the other portion of the parameters using a kernel function to map the second sequence to a feature set.

* * * * *